(12) United States Patent
Li et al.

(10) Patent No.: US 11,430,329 B2
(45) Date of Patent: Aug. 30, 2022

(54) METHOD FOR ANTICIPATING TIPPING POINT OF TRAFFIC RESILIENCE BASED ON PERCOLATION ANALYSIS

(71) Applicant: BEIHANG UNIVERSITY, Beijing (CN)

(72) Inventors: Daqing Li, Beijing (CN); Guanwen Zeng, Beijing (CN)

(73) Assignee: Beihang University, Beijing (CN)

( * ) Notice: Subject to any disclaimer, the term of this patent is extended or adjusted under 35 U.S.C. 154(b) by 605 days.

(21) Appl. No.: 16/528,388

(22) Filed: Jul. 31, 2019

(65) Prior Publication Data
US 2019/0355244 A1    Nov. 21, 2019

(51) Int. Cl.
*G06N 5/02*     (2006.01)
*G08G 1/01*     (2006.01)

(52) U.S. Cl.
CPC ............ *G08G 1/0125* (2013.01); *G06N 5/02* (2013.01); *G08G 1/0137* (2013.01)

(58) Field of Classification Search
CPC ....... G08G 1/0125; G08G 1/0137; G06N 5/02
See application file for complete search history.

*Primary Examiner* — Mathew Franklin Gordon

(57) ABSTRACT

A method for anticipating the tipping point of traffic resilience based on percolation analysis, includes steps of: step (I) based on the topology structure of the urban road network and daily traffic operation data, constructing the urban traffic dynamical network; step (II): based on the urban traffic dynamical network constructed, analyzing the relationship between the system performance of urban traffic functional network and the congestion rate by percolation analysis; and step (III): based on the relationship between the system performance and the congestion rate, exploring the resilience function of the urban traffic functional network, and analyzing its resilience pattern and its resilience tipping point.

4 Claims, 2 Drawing Sheets

---

Constructing an urban traffic dynamical network;

↓

Analyzing a relationship of a system performance under different congestion rates;

↓

Exploring a resilience function of urban traffic functional network and analyzing a resilience pattern and tipping point;

↓

Analyzing evolution law of a largest congested subgroup and calculate prediction index of system resilience limit.

METHOD FOR ANTICIPATING TIPPING POINT OF TRAFFIC RESILIENCE BASED ON PERCOLATION ANALYSIS

CROSS REFERENCE OF RELATED APPLICATION

The present application claims priority under 35 U.S.C. 119(a-d) to CN 201811084656.0, filed Sep. 18, 2018.

BACKGROUND OF THE PRESENT INVENTION

Field of Invention

The present invention provides a method for anticipating the tipping point of traffic resilience based on percolation analysis, which relates to a method for anticipating the tipping point of traffic resilience and for simultaneously proposing a corresponding real-time prediction indicator based on percolation analysis, and belongs to the field of a multidiscipline of traffic reliability and network science.

Description of Related Arts

The operational reliability of urban transportation systems is an important branch newly emerged in the field of reliability, which mainly studies the ability of the transportation systems to meet certain traffic demands within specified time and under specified traffic conditions. With the introduction of the concept of "smart city", many studies have been focused on a smarter urban transportation system, which is capable of rapidly recovering to a functional level after failures. System resilience measures the ability of the system to adapt to the disturbance and return to a functional level as soon as being disturbed by external factors. Since systems in the real world are often exposed to a complex and ever-changing environment, how to understand and improve the system resilience has become a hot issue in recent years. The study of system resilience first emerged in natural systems, such as the self-recovery process of ecosystems under extreme weather. Later, scholars and experts in related fields expanded the concept of system resilience to diverse complex systems, such as biological systems, climate systems, and financial systems. However, studies on the resilience of engineering systems especially critical infrastructures are still rare. Critical infrastructures often have fixed network structural characteristics compared to natural and social systems. Thus, for these complex engineering systems, it remains unclear yet what their resilience patterns are and how their resilience tipping points can be identified.

The percolation theory is well applied in analyzing the properties of network systems with different topological structures. Based on the percolation theory, the present invention defines the resilience of the urban traffic functional network: the ability of the urban traffic functional network capable of recovering to its original performance level under a given congestion rate, wherein the congestion rate refers to the fraction of congestion roads over all the roads in the road network. The main method adopted by the present invention is to analyze the relationship between the system performance of an urban traffic functional network and the congestion rate by percolation analysis, and to explore the resilience function of the system according to this relationship. An important aspect of the understanding and analysis of system resilience is how to anticipate its tipping point, where a dramatic change in properties (called critical transition) can occur. This violent phase change is likely to cause the system to deviate significantly from its original performance level and therefore lose its original functionality. On this basis, the tipping point of traffic resilience proposed by the present invention is defined as: the congestion rate corresponding to the critical point where the urban traffic resilience function shifts from the stable regime to the metastable regime. The stable regime refers to a phase region where only one single system performance phase exists, whereas the metastable regime refers to a phase region where multiple system performance phases exist.

The theoretical basis for anticipating the tipping point of system resilience proposed in the previous studies is to analyze whether the system shows a critical slowing down phenomenon, in which the closer the system is to its resilience tipping point, the slower the speed of the system restoring to original performance level will be once disturbed by external perturbations. On this basis, the conventional prediction indicators of the resilience tipping point can be mainly divided into two categories: the indicator based on autocorrelation coefficient and the indicator based on variance of the system performance. When the system approaches its resilience tipping point, both indicators will show an increasing trend. Although these indicators are widely used, they have the following limitations: first, conventional indicators rely on high-quality and long-term time series data to obtain accurate results; second, although the conventional indicators can measure the temporal evolution of the system performance, it cannot reveal the topological features embedded in the system, making it difficult to unveil the structural factors for system resilience.

Aiming at relaxing the limitation of the resilience tipping point anticipation method and prediction indicator in the conventional system, the method for anticipating the tipping point of traffic resilience based on percolation analysis proposed by the present invention has advantages as follows: first, the method proposed by the present invention only depends on the topology information of the urban road network and the daily traffic operation information to obtain an accurate real-time prediction result; second, the method proposed by the present invention can simultaneously providing a real-time prediction indicator for the closeness of the traffic resilience approaching its tipping point. This indicator is based on topology information, which can also be applied in analyzing the system resilience of other critical infrastructures.

SUMMARY OF THE PRESENT INVENTION

1. Objects of the Present Invention

A main object of the present invention is to define the traffic resilience and analyze the tipping point of traffic resilience based on percolation theory. Here, traffic resilience is defined as the ability of the urban traffic functional network to recover to its original performance level at a given congestion rate, and the resilience tipping point is defined as the urban congestion rate corresponding to the critical point where the urban traffic resilience function shifts from the stable regime to the metastable regime.

Taking advantage of the spatio-temporal traffic data, analyze the relationship between the system performance of the urban traffic functional network and the congestion rate by percolation analysis; based on the relationship between the system performance of the urban traffic functional network and the congestion rate, explore the resilience function of the urban traffic functional network, and simultaneously analyze its resilience pattern and its resilience tipping point. The method in the invention simultaneously proposes a real-time prediction indicator for the closeness of the traffic resilience to its tipping point. That is, by analyzing the temporal evolution of the size of the largest traffic congested cluster, hereinafter referred to as "the largest congested cluster", we can predict whether the urban traffic functional network is approaching its resilience tipping point or not. The congested cluster refers to the traffic flow subgroup cluster formed by a plurality of nodes and connecting edges with low velocity (congested).

2. Technical Solutions of the Present Invention

The present invention provides a method for anticipating the tipping point of traffic resilience based on percolation analysis, specifically comprising steps of:
step (I) based on the topology structure of the urban road network and daily traffic operation data, constructing the urban traffic dynamical network;
step (II): based on the urban traffic dynamical network constructed, analyzing the relationship between the system performance of urban traffic functional network and the congestion rate by percolation analysis;
step (III): based on the relationship between the system performance and the congestion rate, exploring the resilience function of the urban traffic functional network, and analyzing its resilience pattern and its resilience tipping point.

By steps mentioned above, the method for anticipating the tipping point of traffic resilience based on percolation analysis effectively analyzes the resilience pattern and the resilience tipping point of an urban traffic functional network; the method can help urban transportation administrators to evaluate and predict system performance transitions of urban traffic functional network, and provide early warning signals for urban traffic congestion; the method for anticipating the tipping point of traffic resilience based on percolation analysis provided by the present invention is capable of simultaneously providing a real-time prediction indicator for the closeness of the traffic resilience to its tipping point, which can offer theoretical and technical guidance for traffic control, and help resolve hot issues in current research interests such as mitigating traffic congestion and building smart cities.

Preferably, the step (I) of based on the topology structure of the urban road network and daily traffic operation data, constructing the urban traffic dynamical network, specifically comprises process as follows:
(1) abstracting the topological network of an urban road network: usually each road segment in urban road network is regarded as an edge, and the intersection between road segments is regarded as a node; by connecting nodes with corresponding edge(s) in between, one can abstract a topological network of the urban road network;
(2) constructing the urban traffic dynamical network with daily traffic operation data: first register the daily traffic operation data (e.g., velocity) to each road; for each road, the 95th percentile of its velocity in each day is selected as its limited maximal velocity, $v_{ij}^m$; and the relative velocity of that road at current time t, $r_{ij}(t)$, is defined as the ratio between its velocity at time t (denoted by $v_{ij}(t)$) and its limited maximal velocity measured for that day; wherein the specific formula is:

$$r_{ij}(t)=v_{ij}(t)/v_{ij}^m$$

wherein i is the starting point and j is the end point of a given road segment; in this way, a dynamical traffic network can be constructed from the traffic dynamics of the original road network.

In this step, to build the dynamical network according to traffic data at each instant, interpolation from original data is necessary due to the lack of velocity data on some roads. For a road without velocity data at certain instant, the present invention considers its velocity as the average velocity over its entire neighboring roads. By repeating this process, the velocity data of all roads at each instant can be completed.

Preferably, the step (II) of based on the urban traffic dynamical network constructed, analyzing the relationship between the system performance of the urban traffic functional network and the congestion rate by percolation analysis, specifically comprises steps of:
analyzing the percolation process of the urban traffic dynamical network, comprising: at each time t, sorting all edges according to its relative velocity from small to large in the dynamical network constructed; for different values of congestion rate f, removing the edges of fraction f with lowest velocities; the remaining network is a functional network composed of traffic flow clusters (formed by edges with high velocity), each of which is denoted as a functional cluster; recording the size (number of nodes in a functional cluster divided by the total number of nodes in the original road network) of the largest functional cluster in the functional network under each congestion rate f, which is denoted as G;

In this step, according to percolation theory, the size of the largest functional cluster G serves as an order parameter for network connectivity under given conditions, and can be applied to measuring the system performance of the urban traffic functional network, where a larger G indicates a higher performance level of the urban traffic functional network.

Preferably, the step (III) of based on the relationship between the system performance and the congestion rate, exploring the resilience function of the urban traffic functional network, and analyzing its resilience pattern and its resilience tipping point, specifically comprises process as follows:
(1) exploring the resilience function of the urban traffic network: the traffic resilience function is obtained by a suitable fitting of the relationship between the largest functional cluster size G and the congestion rate f;
(2) analyzing the resilience pattern and the resilience tipping point by the fitted traffic resilience function: analyzing the traffic resilience pattern unveiled by the fitted resilience function, especially on the shape of the stable regime and the metastable regime; by finding out the congestion rate f where the system shifts from the stable regime to the metastable regime, denoted by $f_c$, the tipping point of traffic resilience is therefore located.

Through the above-mentioned method for anticipating the tipping point of traffic resilience based on percolation analysis, a real-time prediction indicator for the closeness of the traffic resilience to its tipping point can be proposed simultaneously. The specific content and practices are as follows:
for a given relative speed threshold Q ($0 \leq Q \leq 1$), each road in the road network is classified by two categories: functional if $r_{ij}(t) \geq Q$, and congested otherwise; on this basis, the temporal evolution of the size of the largest congested cluster (composed of a plurality of nodes and connecting congested edges with $r_{ij}(t)<Q$) is analyzed: if the size of the largest congested cluster shows an increasing trend, the urban traffic functional network is therefore approaching its resilience tipping point, an early warning signal is required; otherwise, the urban traffic functional network is moving away from its resilience tipping point.

3. Advantages and Beneficial Effects of the Present Invention

Compared to previous studies on the reliability of urban transportation systems, the present invention provides a method for anticipating the tipping point of traffic resilience based on percolation analysis. It has the following advantages: first, based on the percolation theory, the present invention defines the urban traffic resilience, and provides a method for anticipating its resilience tipping point; second, via the method of the invention, it is possible to simultaneously propose a real-time prediction indicator, which can be helpful for designing early warning signals for possible large-scale congestion. The real-time prediction indicator can be calculated with short-term daily traffic operation data; third, the method for anticipating the tipping point of traffic resilience proposed by the present invention only depends on the topology information of the urban road network and the daily traffic operation data (e.g., velocity), which can be generalized for other critical infrastructure including power grid and airline networks.

Figure 2:
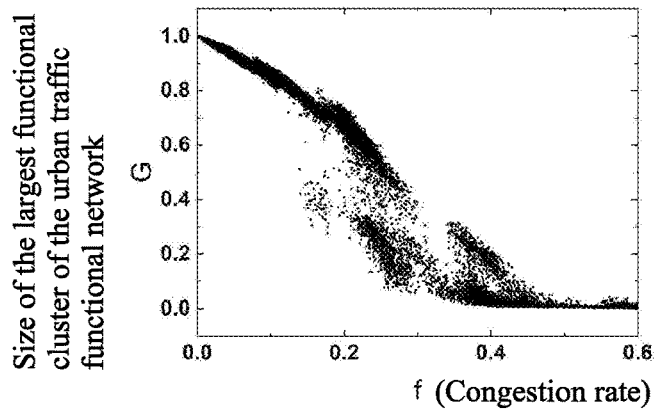
FIG. 2 is a phase diagram describing different system performance of an urban traffic functional network at different congestion rates.

The serial numbers, symbols and code numbers in the Figs. are as follows:

In the FIG. 2:

f: congestion rate of the urban traffic functional network, i.e., the fraction of the number of congested roads over the total number of roads in the urban road network.

G: the size of the largest functional cluster of the urban traffic functional network, i.e., number of nodes in a functional cluster divided by the total number of nodes in the original road network, which should be a normalized value between 0 and 1. G serves as an indicator of system performance of the urban traffic functional network.

Figure 3:
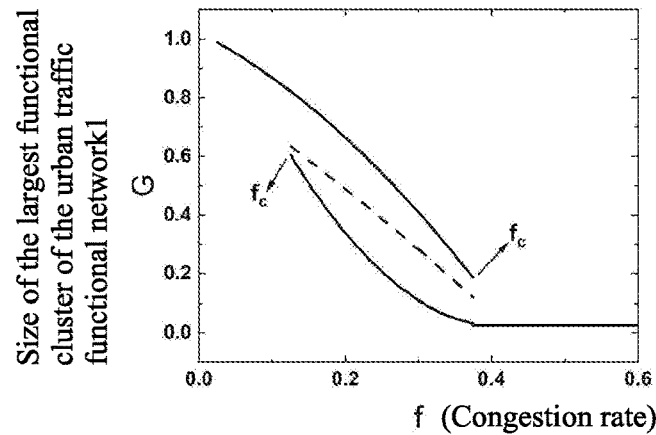
FIG. 3 is a fitted resilience function of an urban traffic functional network; wherein the solid lines represent different system performance phases (including the high-performance phase and the low-performance phase), and the dashed line is the boundary line separating the above-mentioned two phases. The critical congestion rates, where the urban traffic resilience function shifts from the stable regime to the metastable regime, represent the traffic resilience tipping points.

In the FIG. 3:

f: congestion rate of the urban traffic functional network, i.e., the fraction of the number of congested roads over the total number of roads in the urban road network.

G: the size of the largest functional cluster of the urban traffic functional network, i.e., number of nodes in a functional cluster divided by the total number of nodes in the original road network, which should be a normalized value between 0 and 1. G serves as an indicator of system performance of the urban traffic functional network.

$f_c$: resilience tipping point of the urban traffic functional network.

DETAILED DESCRIPTION OF THE PREFERRED EMBODIMENT

In order to make the technical problems and technical solutions to be solved in the present invention more apparent, further description of the preferred embodiment of present invention is illustrated in detail below, combining with the flow chart of the method in the FIG. 1 of the present invention.

Figure 1:
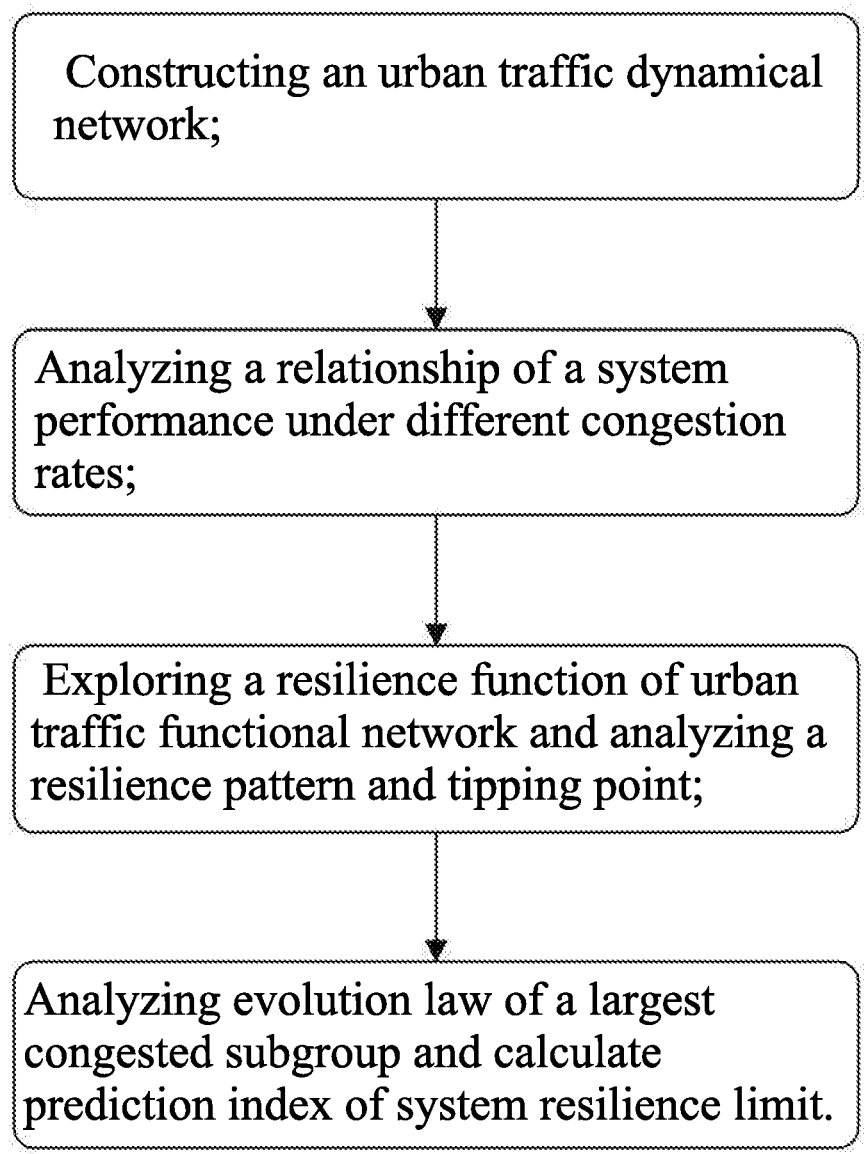
FIG. 1 is a flow chart of the method of the present invention.

As shown in FIG. 1, the present invention provides a method for anticipating the tipping point of traffic resilience based on percolation analysis, which specifically comprises following steps of:

step (I): based on the topology structure of the urban road network and daily traffic operation data, constructing the urban traffic dynamical network;

(1) in the present invention taking city A as an example and constructing a dynamical network with its daily velocity information; wherein the dynamical network contains over 50,000 edges and about 27,000 nodes, and covers a period of 17 working days in a month of a given year;

(2) normalizing and registering the relative velocity to each corresponding road segment; the relative velocity is derived from the road velocity at current time divided by the limited maximal velocity of that road for a given day.

(3) through the above (1) and (2), by connecting the urban topological road network with relative velocity information at each time, the urban traffic dynamical network is constructed;

step (II): based on the urban traffic dynamical network constructed, analyzing the relationship between the system performance of the urban traffic functional network and the congestion rate by percolation analysis, comprising:

at each time t, sorting all edges according to its relative velocity from small to large in the dynamical network constructed; for different values of congestion rate f (from 0 to 1 with the resolution of $\Delta f=0.01$), removing the edges of fraction f with lowest velocity; the remaining network is a functional network composed of traffic flow clusters (formed by edges with high velocity), each of which is denoted as a functional cluster; recording the size (number of nodes in a functional cluster divided by the total number of nodes in the original road network) of the largest functional cluster in the functional network under each congestion rate f, which is denoted as G;

step (III): based on the relationship between the system performance and the congestion rate, exploring the resilience function of the urban traffic functional network, and analyzing its resilience pattern and its tipping point;

exploring the relationship between the system performance and the congestion rate from the phase diagram as shown in FIG. 2; fitting the phase diagram by the second-order polynomial to obtain the resilience function of the urban traffic functional network, as shown in FIG. 3. It can be seen that there are two tipping points of traffic resilience for the given system, which are marked by $f_c$ in FIG. 3.

Figure 4:
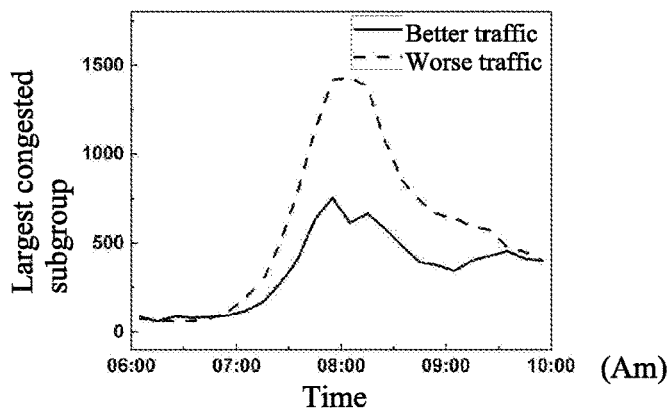
FIG. 4 is a schematic diagram showing the temporal evolution of the traffic resilience indicator during the morning hours under different traffic conditions (good or poor).

Through the above-mentioned method for anticipating the tipping point of traffic resilience based on percolation analysis, a prediction indicator for the closeness of the traffic resilience to its tipping point can be proposed simultaneously:

Based on the daily operation level of city A, setting Q=0.5, which is equivalent to a half of the limited maximal velocity. On this basis, the temporal evolution of the size of the largest congested cluster of the urban traffic functional network is selected for two days, as shown in FIG. 4. What can be seen is that around 7 a.m., which is usually the beginning of the morning peak hours, distinctly different evolutionary trends are displayed under different traffic conditions.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for anticipating a tipping point of traffic resilience based on percolation analysis, comprising steps of:
   step (I) based on a topology structure of an urban road network and daily traffic operation data, constructing an urban traffic dynamical network;
   step (II): based on the urban traffic dynamical network constructed, analyzing a relationship between a system performance of an urban traffic functional network and a congestion rate by percolation analysis;
   step (III): based on the relationship between the system performance and the congestion rate, exploring a resilience function of the urban traffic functional network, and analyzing a resilience pattern and tipping point thereof;
   by steps mentioned above, the method for anticipating the tipping point of traffic resilience based on percolation analysis effectively analyzes the resilience pattern and the resilience tipping point of the urban traffic functional network; the method is capable of helping urban transportation administrators to evaluate and predict system performance transitions of the urban traffic functional network, and provide early warning signals for urban traffic congestion; the method for anticipating the tipping point of traffic resilience based on percolation analysis is capable of simultaneously providing a real-time prediction indicator for closeness of the traffic resilience to the tipping point thereof, which is capable of offering theoretical and technical guidance for traffic control, and help resolve hot issues in current research interests comprising mitigating traffic congestion and building smart cities;
   through the method for anticipating the tipping point of traffic resilience based on percolation analysis mentioned above, the real-time prediction indicator for the closeness of the traffic resilience to the tipping point thereof is proposed simultaneously; wherein a specific content and practices are as follows:
   for a given relative speed threshold Q ($0 \leq Q \leq 1$), each road in a road network is classified by two categories: functional if $r_{ij}(t) \geq Q$, and congested otherwise; on a basis, the temporal evolution of a size of a largest congested cluster (composed of a plurality of nodes and connecting congested edges with $r_{ij}(t)<Q$ is analyzed: wherein if the size of the largest congested cluster shows an increasing trend, the urban traffic functional network is therefore approaching the resilience tipping point thereof, an early warning signal is required; otherwise, the urban traffic functional network is moving away from the resilience tipping point thereof.

2. The method for anticipating the tipping point of traffic resilience based on percolation analysis, as recited in claim 1, wherein the step (I) of based on the topology structure of the urban road network and daily traffic operation data, constructing the urban traffic dynamical network, specifically comprises steps of:
   (1) abstracting a topological network of the urban road network: usually each road segment in the urban road network is regarded as an edge, and an intersection between road segments is regarded as a node; by connecting nodes with corresponding edge(s) in between, a topological network of the urban road network is abstracted;
   (2) constructing the urban traffic dynamical network with the daily traffic operation data comprising: first registering the daily traffic operation data (e.g., velocity) to each road; for each road, selecting a 95th percentile of velocity thereof in each day as a limited maximal velocity, wherein $v_{ij}^m$; and a relative velocity of a road at a current time t, $r_{ij}(t)$, is defined as a ratio between a velocity at time t (denoted by $v_{ij}(t)$) and a limited maximal velocity measured for that day; wherein a specific formula is:

$$r_{ij}(t)=v_{ij}(t)/v_{ij}^m$$

wherein i is a starting point and j is an end point of a given road segment; in this way, a dynamical traffic network is constructed from traffic dynamics of the original road network;
   wherein in the step (2), building the dynamical network according to traffic data at each instant, interpolation from original data is necessary due to lack of velocity data on some roads; for a road without velocity data at certain instant, a velocity thereof is considered as an average velocity over entire neighboring roads; by repeating process, velocity data of all roads at each instant is completed.

3. The method for anticipating tipping point of traffic resilience based on percolation analysis, as recited in claim 1, wherein the step (II) of based on the urban traffic dynamical network constructed, analyzing the relationship between the system performance of the urban traffic functional network and the congestion rate by percolation analysis, which specifically comprises steps of:
   analyzing a percolation process of the urban traffic dynamical network, comprising: at each time t, sorting all edges according to a relative velocity from small to large in the urban traffic dynamical network constructed; for different values of congestion rate f, removing the edges of fraction f with lowest velocities; a remaining network is a functional network composed of traffic flow clusters which is formed by edges with high velocity, each of which is denoted as a functional cluster; recording a size (number of nodes in a functional cluster divided by the total number of nodes in the original road network) of a largest functional cluster in the functional network under each congestion rate f, which is denoted as G;
   wherein in the step (II), according to percolation theory, the size of the largest functional cluster G serves as an order parameter for network connectivity under given conditions, and is applied to measuring the system performance of the urban traffic functional network, where a larger G indicates a higher performance level of the urban traffic functional network.

4. The method for anticipating a tipping point of a transportation system based on percolation analysis, as recited in claim 1, wherein the step (III) of based on the relationship between the system performance and the congestion rate, exploring the resilience function of the urban traffic functional network, and analyzing the resilience pattern and the resilience tipping point thereof, specifically comprises steps of:
  (1) exploring the resilience function of the urban traffic network: wherein the traffic resilience function is obtained by a suitable fitting of the relationship between the largest functional cluster size G and the congestion rate f;
  (2) analyzing the resilience pattern and the resilience tipping point by a fitted traffic resilience function: analyzing a traffic resilience pattern unveiled by a fitted resilience function, especially on a shape of a stable regime and a metastable regime; by finding out the congestion rate f where the system shifts from the stable regime to the metastable regime, denoted by $f_c$, the tipping point of traffic resilience is therefore located.

* * * * *